United States Patent [19]
Udelle et al.

[11] Patent Number: 5,875,736
[45] Date of Patent: *Mar. 2, 1999

[54] ANIMAL AMUSEMENT AND EXERCISE STIMULATOR

[76] Inventors: Steven D. Udelle; Laura L. Udelle, both of 13 Seasons Dr., Punta Gorda, Fla. 33983-5432

[ * ] Notice: The term of this patent shall not extend beyond the expiration date of Pat. No. 5,540,187.

[21] Appl. No.: 862,076

[22] Filed: May 22, 1997

Related U.S. Application Data

[63] Continuation-in-part of Ser. No. 354,275, Dec. 12, 1994, Pat. No. 5,634,435.

[51] Int. Cl.⁶ ................................................. A01K 29/00
[52] U.S. Cl. ................................... 119/706; 119/707
[58] Field of Search ............................ 119/706, 707, 119/711

[56] References Cited

U.S. PATENT DOCUMENTS

| | | | |
|---|---|---|---|
| 5,269,261 | 12/1993 | McCance | 119/706 |
| 5,269,264 | 12/1993 | McCance | 119/707 |
| 5,517,945 | 5/1996 | Udelle | 119/706 X |
| 5,540,187 | 7/1996 | Udelle et al. | 119/706 |
| 5,542,376 | 8/1996 | Udelle et al. | 119/707 |
| 5,544,623 | 8/1996 | Udelle et al. | 119/706 |
| 5,575,240 | 11/1996 | Udelle et al. | 119/707 |
| 5,579,725 | 12/1996 | Boshears | 119/706 |
| 5,595,141 | 1/1997 | Udelle et al. | 119/706 |
| 5,634,435 | 6/1997 | Udelle et al. | 119/706 |

*Primary Examiner*—Robert P. Swiatek

[57] ABSTRACT

An animal amusement and exercise device is provided with a motor and a pair of arm extensions affixed to a rotating motor shaft, wherein the end of each arm extension supports an object that is rotated continuously within a circular enclosure. The enclosure has several openings in its peripheral sidewall, whereby an animal may place its paw therethrough to catch the momentarily visible object. A claw stretching material is provided on the upper surface of the housing, whereby an animal can scrape its claws thereon.

14 Claims, 2 Drawing Sheets

5,875,736

ANIMAL AMUSEMENT AND EXERCISE STIMULATOR

This application is a continuation-in-part of prior application Ser. No. 08/354,275, filed Dec. 12, 1994, titled "Animal Amusement and Exercise Stimulator," and now U.S. Pat. No. 5,634,435.

1. FIELD OF THE INVENTION

The present invention relates to animal amusement devices, and more particularly to a combination animal amusement and exercise stimulator device, that continuously moves an object back and forth within an orbital path. The continuous movement of the object provides a compelling attraction to an animal, whereby an animal will frequent the device on its own initiative more often, thereby improving its physical condition, health, mental alertness and amusement, through its own efforts.

2. BACKGROUND-DISCUSSION OF THE PRIOR ART

Animal toys and amusement devices have a movable object on, around, or within these devices. An animal is usually shown by demonstration the movable or rolling object in the device, whereby the animal's inherent instinct to attack or play with the moving object is imminent. However, these objects have to be initially moved by an animal or a human to begin with, and unfortunately, a good device becomes unused for long periods of time and just occupies space. Cats can easily become obese, bored, and listless from lack of amusement and exercise over a period of time. The prior art more closely associated to the present invention are U.S. Pat. No. 4,722,299, by Mohr, Feb. 2, 1988, which shows a toy with a closed loop or track, containing a loose ball inside the track housing. The ball is captive within the housing and is exposed to the continuous opening of the inside edge of the track. A cat can swat the ball around the track through the opening with its paw. U.S. Pat. No. 5,269,261, by McCance, Dec. 14, 1993, shows a similar device to Mohr, wherein the ball is visible at the top of the track, and the center portion of the loop contains a replaceable, corrugated cardboard scratching pad. The above described devices have dormant, movable objects when not in use. The prior art does not teach on the use of a motivational means that would exhibit an irresistable incentive or attraction to an animal, whereby the animal would benefit from increased use of the device. The present invention takes advantage of the inherent instincts of an animal's response to a moving object, when the original movement of the object is not physically initiated by the animal or human hand, but by the device.

SUMMARY OF THE INVENTION

Generally, the present invention is comprised of a circular housing, containing an inclined, U-shaped trough, or gutter confining a ball-shaped lure within. The circular housing has a carpeted platform affixed at its top, concealing a portion of the U-shaped trough, thereby creating a hide and seek scenario for the ball-shaped lure. A motorized mechanism concealed below the carpeted platform cover is comprised of a motor, motor output shaft, an elongated propulsion arm mounted at a right angle to the motor output shaft, and including a plurality of short, reversing switch actuating arms. When the motor is energized, the propulsion arm sweeps, or propels the ball shaped lure from the concealed U-shaped trough area out and around the exposed trough area, and back into the concealed area. The propulsion arm stops short of exposing itself when one of the actuating arms contacts the reversing switch, thereby reversing the motor and repeating the sweep or propulsion of the returned lure in the opposite direction. This back and forth event is continuous. If a cat stops the lure and then releases it, the lure will return to the concealed propulsion arm because of the inclined trough. This alternating exposure of the travelling lure is exciting to a cat.

It is therefore an object of the present invention to provide an animal amusement and exercise stimulating device that does not require an animal or a human hand to initiate the movement of the lure.

It is another object of the invention to activate the device when the animal is in its most active period, two to three times a day, for a duration of thirty minutes each.

It is an object of the invention to have an animal expend its surplus energy at scheduled intervals, hereby developing improved muscle tone, alertness, coordination, and better sleeping habits.

It is an object of the invention that upon activation of the device, a cat will always respond to the moving lure.

It is another object of the invention that the exercise stimulator would relieve the animal from boredom, by providing amusement, thereby saving areas of household furniture from damage.

Another object of this invention is that an enticement, such as catnip, would no longer be required.

Other objects and advantages may be readily determined by the following descriptions.

COMPLETE DESCRIPTION OF THE INVENTION

Figure 1A:
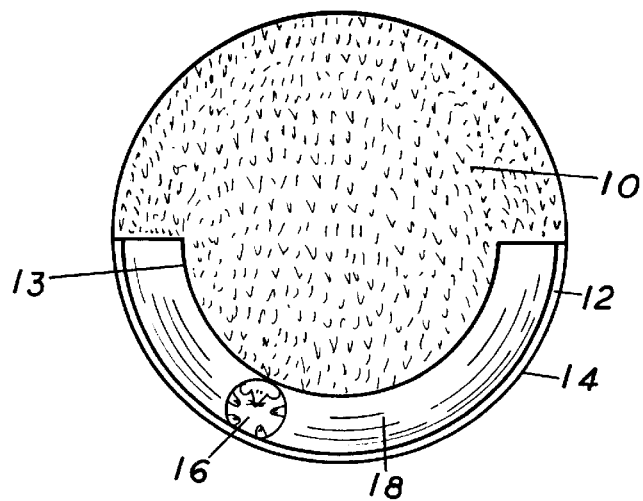
FIG. 1a is a top plan view of the device showing a carpeted platform cover, partially exposing a trough or gutter, confining a ball-shaped lure within.

FIG. 1a is a plan top view of the present invention, comprised of a circular housing 14, a carpeted platform cover 10 affixed to a portion of outer edge 12 and concealed inner edge 13, including a movable object, or ball-shaped lure 16 confined within a closed circuit U-shaped trough or gutter 18.

Figure 1B:
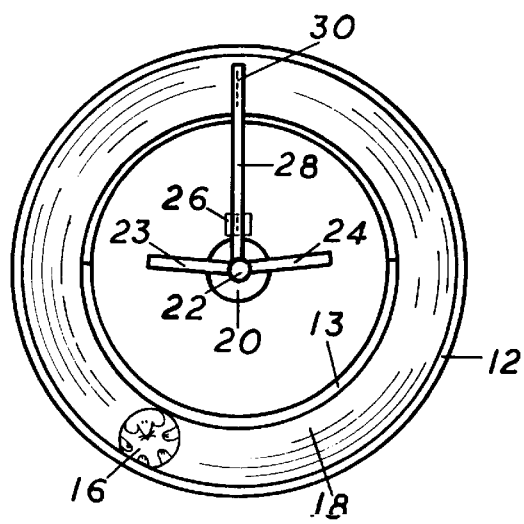
FIG. 1b is a plan top view with the carpeted platform cover of FIG. 1a removed, showing a motorized mechanism.

FIG. 1b is a plan top view with the carpeted platform cover 10 of FIG. 1a removed, exposing concealed mounting edges 13 and 12 and a motorized mechanism comprised of a motor 20, motor shaft 22, a double pole, double throw motor reversing switch 26, a plurality of actuating arms 23 and 24, and a propulsion or sweep arm 28 with a paddle blade 30, shown in hidden lines, affixed to the bottom edge of propulsion sweep arm 28.

Figure 1C:
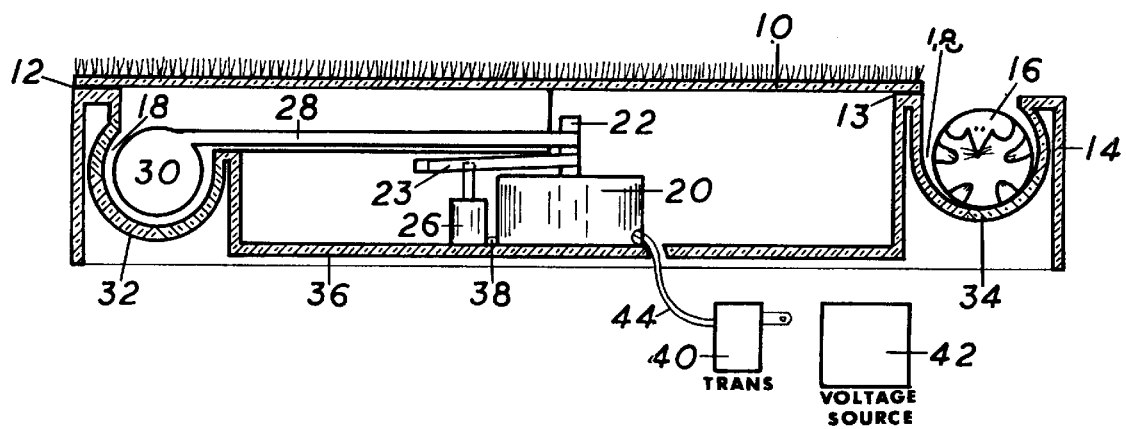
FIG. 1c is a side plan view showing the position of each component in detail.

FIG. 1c is a side plan view of the device housing in cross-section, showing the position of the components within the interior of the device, comprised of a circular housing 14, containing the closed circuit U-shaped gutter or trough 18 around its outermost perimeter. The closed circuit U-shaped trough 18 is inclined upwards from its concealed portion 32 to its exposed portion 34 and confines the movable object or ball-shaped lure 16 within. The circular housing 14 has the carpeted platform cover 10 affixed to housing top edges 12 and 13, concealing a portion of the U-shaped trough 18, thereby creating a hide and seek scenario for the ball-shaped lure 16. The motorized mechanism concealed below the carpeted cover 10 is comprised of the motor 20 affixed by fasteners 38 to housing base 36, the motor output shaft 22, an elongated propulsion or sweep arm 28 including the paddle 30 at one end mounted at the right angle to the motor output shaft 22, including the plurality of actuating arms 23 and 24. Referring to FIGS. 1b and 1c, when the motor is energized from voltage source 42, via transformer/plug 40 and connecting wires 44, the propulsion arm 28 sweeps or propels the ball-shaped lure 16 from the concealed portion of trough 18 counterclockwise, out, and around the exposed portion of trough 18, and then back into the concealed trough area. The propulsion arm paddle 30 stops short of exposing itself when the actuating arm 24 (not shown in FIG. 1c), contacts the reversing switch 26, thereby reversing the motor, and repeating the sweep or propulsion of the returned lure 16 in a clockwise orbit. This back and forth orbiting event is continuous. If a cat stops the lure and then releases it, the lure will return to the concealed propulsion paddle from the upper trough incline 34 to the lower trough incline 32 by itself, ready to be propelled around again. This alternating exposure of the orbiting lure is exciting to an animal. The motor rpm works effectively between 20 and 40 rpm.

Figure 2:
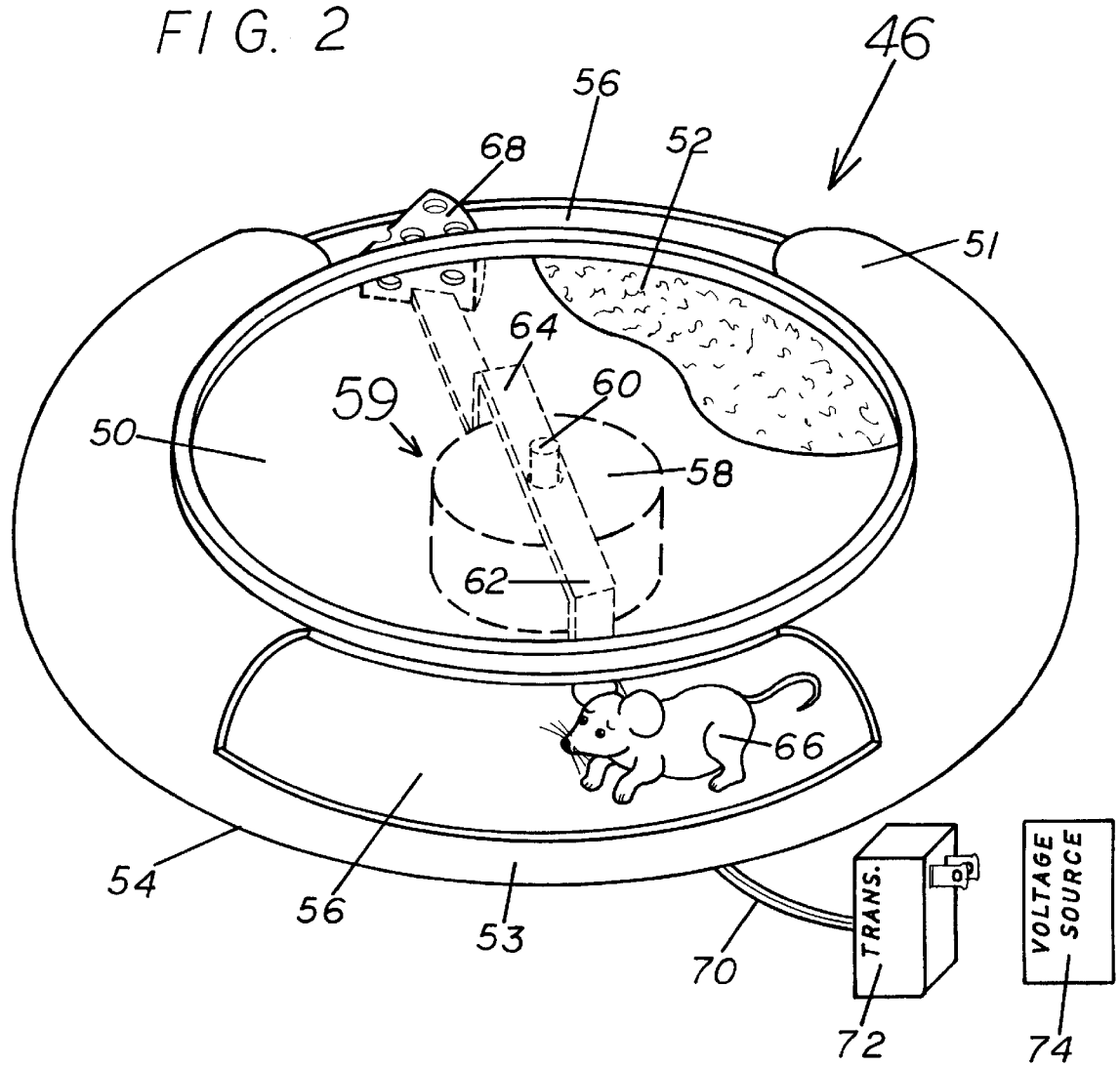
FIG. 2 is an alternate embodiment of FIGS. 1a, 1b, and 1c shown in a perspective view and the internal elements shown in hidden lines.

FIG. 2 is an alternate embodiment of FIGS. 1a, 1b, and 1c shown in a perspective view with the internal elements shown in hidden lines of housing assembly 46. Housing assembly 46 comprises an upper surface 50, with peripheral portion 51 of upper surface 50 arcuately formed downwards providing a peripheral sidewall 53 affixed to the base or lower surface 54 of housing assembly 46. A motor assembly 59 shown in hidden lines comprises a motor 58, for rotating motor output shaft 60, a plurality of elongated arms 62 and 64, wiring 70, low voltage converter 72, and a wall outlet voltage source 74. Elongated arm 62 propels a movable object 66 or mouse affixed to an end of the arm remote from motor shaft 60, and elongated arm 64 propels a movable object or scented cheese wedge 68 affixed to an end of the arm remote from motor shaft 60. A plurality of openings 56 are provided for viewing by an animal of either movable objects as they orbit the housing. Motor 58 rpm can be preselected or varied by adding a speed controller. The most suitable rpm range for animal play is within 10 to 25 rpm. The motor can be operated by a battery or a low voltage converter. The preferred low voltage converter would save considerable battery replacement costs. The motor design is such that stalling the motor and causing it to momentarily rotate in an opposite direction of its normal rotation will not harm the motor assembly, as it will always return to its original rotational mode. The upper surface 50 of housing assembly 46 further includes an animal claw scraping material 52, whereby an animal can satisfy its inherent instincts to stretch its claws thereon, thereby preventing damage to household furnishings.

CONCLUSION

Thus, it has been shown that the animal amusement and exercise stimulator can perform all of the objectives as outlined above. Many other variations are possible, for example: it would be obvious to those skilled in the art that may consider using magnetic force fields to induce object movements in lieu of mechanical propulsion or a combination thereof, intermittant powered motors to create a stop and go lure movement, lures of different shapes, or using sensors, such as heat or motion to automatically activate the device, or electronic sound synthesizers. While the above descriptions may contain many specific details, these should not be construed as limitations on the scope of the invention, but rather as examples of embodiments or modifications, herein detailed in accordance with the descriptive requirements of law. It should be understood that the details are to be interpreted as illustrative and not in a limiting sense.

We claim:

1. An animal amusement and exercise stimulator device comprising:
    a) a housing having a base and a continuous outer surface extending from said base so as to define an enclosed interior space; end
    b) at least one unobstructed opening disposed in said outer surface of said housing; said at least one opening being so sized and configured so as to permit an animal to insert its paw therethrough; and
    c) a shaft disposed below said outer surface of said housing and means for rotating said shaft disposed therein said housing; and
    d) at least one object disposed within said housing and means for propelling said at least one object to move within said housing; and
    e) said means for propelling said at least one object further comprises an elongated arm mounted to said shaft at an angle therewith supporting an object at each end of said arm remote from said shaft.

2. The device of claim 1, wherein said housing is circular in cross-section.

3. The device of claim 1, wherein said means for rotating said shaft comprises a motor.

4. The device of claim 1, wherein said at least one object is a mouse.

5. The device of claim 4, wherein said at least one object is a cheese wedge.

6. The device of claim 5, wherein said at least one object is an attractant to animals.

7. The device of claim 1, wherein said outer surface of said housing includes means for permitting an animal to stretch its claws thereon and thus function as a scratching pad for said animal.

8. The device of claim 1, wherein said at least one unobstructed opening disposed in said outer surface of said housing further comprises a plurality of unobstructed openings so as to permit said animal to insert its paw therethrough.

9. An animal amusement and exercise stimulator device comprising:
    a) a housing having a base and a continuous outer surface extending from said base so as to define an enclosed interior space; and
    b) at least one unobstructed opening disposed in said outer surface of said housing; said at least one opening being so sized and configured so as to permit an animal to insert its paw therethrough; and
    c) a shaft disposed below said outer surface of said housing and means for rotating said shaft disposed therein said housing; and
    d) a plurality of objects disposed therein said housing and means for propelling said objects to move within said housing, said means propelling said objects comprises an elongated arm mounted to said shaft at an angle therewith supporting said objects at each end of said elongated arm remote from said shaft.

10. The device of claim 9, wherein said housing is circular in cross-section.

11. The device of claim 9, wherein said means for rotating said shaft comprises a motor.

12. The device of claim 9, wherein said objects disposed therein said housing are attractants to animals.

13. The device of claim 9, wherein said outer surface of said housing includes means for permitting said animal to stretch its claws thereon and thus function as a scratching pad for said animal.

14. The device of claim 9, wherein said at least one unobstructed opening disposed in said outer surface of said housing further comprises a plurality of unobstructed openings.

* * * * *